United States Patent Office 3,796,746
Patented Mar. 12, 1974

3,796,746
UNSATURATED ESTER OF HALOGENATED ALKENES
Gaetano F. D'Alelio, 2011 E. Cedar St.,
South Bend, Ind. 46617
No Drawing. Original application Dec. 19, 1968, Ser. No. 785,336, now Patent No. 3,637,813. Divided and this application Nov. 15, 1971, Ser. No. 198,948
Int. Cl. C07c 69/54
U.S. Cl. 260—486 H     10 Claims

ABSTRACT OF THE DISCLOSURE

This invention deals with new unsaturated esters of $\alpha,\beta$-unsaturated carboxylic acids derived from halogenated alcohols of the formulas $$HO-R-\overset{X}{\underset{}{C}}=\overset{X}{\underset{}{C}}-R' \quad \text{and} \quad HO-R-\overset{X}{\underset{X}{C}}-\overset{X}{\underset{X}{C}}-R'$$

wherein R is a divalent hydrocarbon moiety having at least one and no more than 10 carbon atoms, X is a member selected from the class of bromine and chlorine, and R' is a member selected from the class of hydrogen, X and a molovalent hydrocarbon containing at least one and no more than 20 carbon atoms. Typical esters are the acrylates, methacrylates, maleates, fumarates, itaconates and cinnamates. The monomers possess fire-retardant properties and are useful for the synthesis of polymers and copolymers.

---

This application is a divisional of Ser. No. 785,336, filed Dec. 19, 1968, now U.S. Pat. 3,637,813.

RELATED PRIOR ART

No pertinent prior art is known. The closest related prior art are the polymers containing pendant halogenated acetylenic groups which are disclosed in J. Polymer Sci., vol. 5, pp. 813–832, pp. 999–1014 and pp. 1245–1264 (1967). However this publication does not show monomers which possess a free vinyl group and a polyhalogenated ethylenic group.

BACKGROUND OF THE INVENTION

This invention involves unsaturated carboxylic acid esters which contain halogen atoms in their structures. In general, it concerns mono- and polycarboxylic acid esters of polyhalogenated alcohols. In particular, it deals with $\alpha,\beta$-unsaturated carboxylic acid esters of halogenated alcohols of the formulas $$HO-R-\overset{X}{\underset{}{C}}=\overset{X}{\underset{}{C}}-R' \quad \text{and} \quad HO-R-\overset{X}{\underset{X}{C}}-\overset{X}{\underset{X}{C}}-R'$$
(A)           (B)

wherein

R is a divalent hydrocarbon containing at least one and no more than 10 carbon atoms,
X is bromine or chlorine, and
R' is H, X or a monovalent hydrocarbon containing at least one and no more than 20 carbon atoms.

Typical esters of this invention are the acrylates, the methacrylates, the $\alpha$-chloroacrylates, the $\beta$-cyanoacrylates, the maleates, the fumarates, the crotonates, the cinnamates, etc. These typical esters are derivatives of $\alpha,\beta$-unsaturated carboxylic acids, all of which contain the essential structure $$-\overset{|}{C}=\overset{|}{C}-COOH$$
(C)

By designating the halogenated alcohols (A) and (B) shown above as ZOH, the new esters of this invention can be represented as containing the essential structure (C):

$$\overset{|}{C}=\overset{|}{C}-COOZ$$

A few typical carboxylic acids from which the essential structure (C) can be derived are $CH_2=CHCOOH$, $CH_2=\overset{CH_3}{\underset{}{C}}-COOH$, $CH_2=\overset{Cl}{\underset{}{C}}COOH$, $CH_2=\overset{C_2H_5}{\underset{}{C}}-COOH$, $CH_3CH=CHCOOH$, $C_6H_5CH=CHCOOH$, $CH_2=\overset{CN}{\underset{}{C}}-COOH$, $HOOC-CH=CH-COOH$, $HOOC-\overset{CH_3}{\underset{}{C}}=CHCOOH$, $HOOC\overset{CH_3}{\underset{}{C}}=\overset{CH_3}{\underset{}{C}}-COOH$, $HOOC-\overset{Cl}{\underset{}{C}}=CH-COOH$, $HOOC-\overset{Cl}{\underset{}{C}}-\overset{Cl}{\underset{}{C}}-COOH$, $HOOCCH_2CH=CHCOOH$, $CH_2=C-COOH$, $CH_2-COOH$,
                                           $|$              $|$
                                           $CH_2COOH$  $C-COOH$
                                                          $\|$
                                                       $CH-COOH$ $CH_3C=\overset{}{\underset{}{C}}COOH$, $NCCH=CHCOOH$, $HOOC\overset{Br\ Br}{\underset{}{C}-C}-COOH$,
$\ \ \ |\ \ |$
$\ \ Cl\ Cl$ $NCCH=\overset{}{\underset{CN}{C}}-COOH$, $CH_2=\overset{}{\underset{H}{C}}-\overset{}{\underset{COOH}{C}}=CH_2$, $CH_2=CH-CH=CHCOOH$, etc.

The $\alpha,\beta$-unsaturated carboxylic may also be defined as having the structure, $$\overset{A}{\underset{A}{\diagdown}}C=\overset{A'}{\underset{}{C}}COOH$$

wherein A and A' are each selected from the class consisting of —H, —X, —CN, —COOZ, —$(CR'_2)_n$COOZ, and R', preferably at least one A or A' representing H or X; $n$ has a numerical value of 1 to 10; and Z is a radical selected from the class of H, $$-R\overset{X}{\underset{}{C}}=\overset{X}{\underset{}{C}}R' \quad \text{and} \quad -R\overset{X}{\underset{X}{C}}-\overset{X}{\underset{X}{C}}R'$$

The esters of this invention are readily prepared by esterifying the acids $$\overset{A\ \ A'}{\underset{A}{C=C}COOH}$$

with the alcohols $$R'CX=CXR-OH \quad \text{and} \quad R'\overset{X}{\underset{X}{C}}-\overset{X}{\underset{X}{C}}-R-OH$$

by procedures well known in the art. Instead of the carboxylic acid, the corresponding acid chloride or anhydride may be used. When the acid chloride is used, preferably, a hydrohalide acceptor such as a tertiary amine, as for example, the trialkyl amines, dimethylaniline, pyridine, etc., are used in the reaction:

$$\overset{|}{C}=\overset{|}{C}-COCl + R'CX=CX-R-OH \xrightarrow{R_3N}$$

$$\overset{|}{C}=\overset{|}{C}-COOR-CX=CX-R' + R_3N\cdot HCl$$

The ester exchange reaction, using the lower alkyl esters of the above acid, for example,

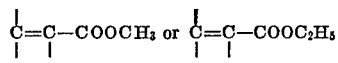

and the alcohol may be used to prepare the new esters of this invention, thus:

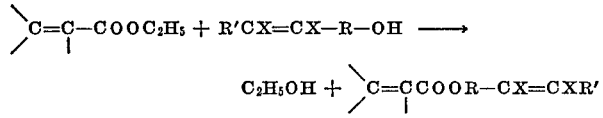

The new esters of this invention can therefore be represented by one of the formulas:

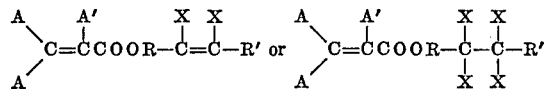

wherein A, A', R, R' and X are as defined above.

Typical divalent hydrocarbon radicals represented by R include

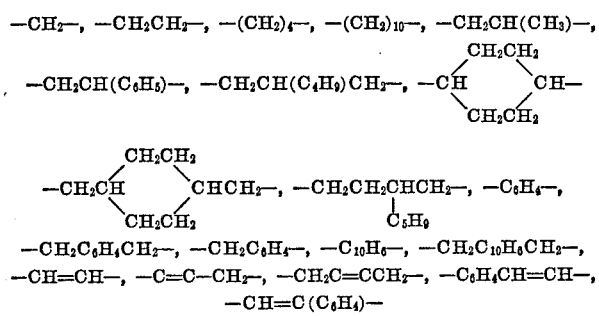

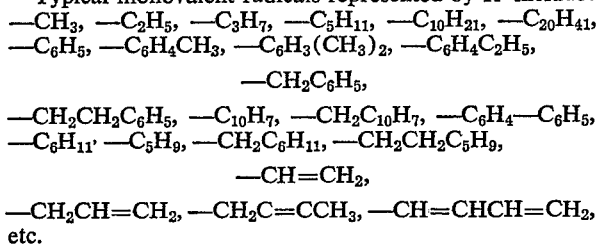

etc.

Typical monovalent radicals represented by R' include:
—CH$_3$, —C$_2$H$_5$, —C$_3$H$_7$, —C$_5$H$_{11}$, —C$_{10}$H$_{21}$, —C$_{20}$H$_{41}$, —C$_6$H$_5$, —C$_6$H$_4$CH$_3$, —C$_6$H$_3$(CH$_3$)$_2$, —C$_6$H$_4$C$_2$H$_5$,

—CH$_2$C$_6$H$_5$,

—CH$_2$CH$_2$C$_6$H$_5$, —C$_{10}$H$_7$, —CH$_2$C$_{10}$H$_7$, —C$_6$H$_4$—C$_6$H$_5$, —C$_6$H$_{11}$, —C$_5$H$_9$, —CH$_2$C$_6$H$_{11}$, —CH$_2$CH$_2$C$_5$H$_9$,

—CH=CH$_2$,

—CH$_2$CH=CH$_2$, —CH$_2$C=CCH$_3$, —CH=CHCH=CH$_2$, etc.

The new esters of this invention are useful with their halogen content as flame retardants and for the preparation of flame-retardant compositions. Those esters which contain an activated terminal vinyl or vinylidene group,

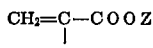

are particularly useful for the preparation of homopolymers and copolymers with other vinyl monomers, including other esters of this invention. The new esters of α,β-unsaturated dicarboxylic esters, such as the maleates, fumarates are particularly useful for the synthesis of copolymers. The esters of this invention find utility not only as monomers but also as plasticizers and fire-retardant additives to other non-polymeric as well as polymeric materials. Especially are they suited, as vinyl monomers, alone or with other monomers, for coreaction with other unsaturated polyesters, typical examples of which are the polyalkylene maleates and fumarates, as well as those unsaturated polyesters modified by non-olefinic polycarboxylic acids such as phthalic, tetrachlorophthalic, tetrabromophthalic or chlorendic anhydride.

The polymerizable monomers of this invention, as illustrated, for example, by the acrylate, methacrylates, itaconates, etc., are readily polymerized or copolymerized to soluble polymers by radical generating initiators, such as the peroxides, hydroperoxides, peracetates or by redox systems including hydrogen peroxide with ferrous salts or sodium bisulfite, potassium or sodium persulfate with bisulfate, etc.; ultraviolet light, ionizing radiation, etc. Radical polymerizations are well known in polymer science and are applicable to the monomers of this invention.

The production of soluble polymers, especially from the new esters containing more than one double bond, particularly those having the structure

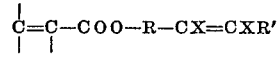

for example, CH$_2$=CHCOOCH$_2$CX=CHX, is surprising and unexpected since the corresponding allyl esters, CH$_2$=CHCOOCH$_2$CH=CH$_2$, and the acetylenic esters, CH$_2$=CHCOOCH$_2$C≡CH, crosslink under radical polymerization as shown in J. Polymer Science, vol. 5, pp. 323–337, 813–832, 999–1014 (1967). These monomers also differ from the corresponding allyl and acetylenic esters in that they do not polymerize with anionic initiators, since the halogen atoms in the new esters of this invention destroy the anionic initiator used. Further, these new esters cannot be prepared directly from the acetylenic ester by halogenation, since the halogenation is not selective and causes halogenation, to a great degree, of the vinyl bond in the acid, thus

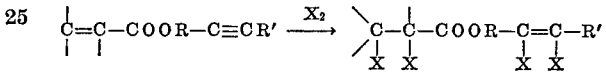

thereby destroying the polymerizability of the original

group.

Some of the polymers obtained by the radical initiation of certain acrylic and methacrylic esters of this invention, such as

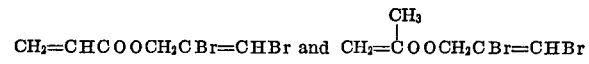

yield polymers having, at least in part, repeating units of the formula

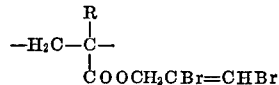

which repeating units are similar to those obtained by the post-halogenation of the completely *linear* polymers obtained by the anionic polymerization of the acetylenic esters of the acrylic acids, as shown in J. Polymer Sci., vol. 5, pp. 813–832, 999–1014 (1967). However, the related polymers of this invention, prepared by radical polymerization are not entirely linear polymers, but, as a result of the well-known radical-transfer phenomenon, particularly in systems comprising halogenated compounds, are branched polymers. This is particularly advantageous when the polymer is intended for use as a fire-retardant additive, since the solution and melt viscosities of branched polymers are notably lower than the related linear polymers of the same molecular weight. This lower viscosity increases the compatibility of the polymers with other polymers, and allows the use of lower temperatures in processing the polymers or mixtures of polymers. Many of the polymers prepared from the monomers of this invention, however, have no relation to the post-halogenated acetylenic ester polymers mentioned hereinabove. For example, the itaconic ester polymers, and the copolymers of the maleic or fumaric esters are readily prepared by the radical initiation of the monomers of this invention, whereas the esters of itaconic acid, fumaric acid and maleic acid, etc., cannot be polymerized anionically, and thus are unavailable for post-halogenation as are the acrylic-type esters.

Another major advantage accrues from the use of many of the monomers of this invention, particularly with the esters of the α,β-unsaturated polycarboxylic acid such as the itaconates, maleates, fumarates, citraconates, etc. The only requirement of the esters of this invention is that at least one of the carboxyl groups of said polycarboxylic acid is esterified by the alcohol, $$R'—CX=CXR—OH$$

the remaining one or more carboxyl groups may be left unreacted or converted to ester groups of the same alcohols, R'CX=CX—R—OH, or of any other saturated, unsaturated, carbocyclic or heterocyclic alcohol, as for example, methyl, ethyl, propyl, amyl, hexyl, stearyl, benzyl, allyl, propargyl, butynyl, β-N,N-dimethylaminoethyl, cyclohexyl alcohols, etc., the β-hydroxyethyl acrylate, β-hydroxypropyl acrylate, β-hydroxyethyl methacrylate, etc., or converted to an acid chloride, or to amides of ammonia, primary amines and secondary amines, such as methylamine, diethylamine, diethanolamine, cyclohexylamine, allylamine, diallylamine, aniline, N-methyl aniline, p-aminophenol, m-aminobenzoic acid, anthranilic acid.

When the remaining one or more carboxylic acid group is converted to an unsaturated ester such as the vinyl, allyl, methallyl, crotyl ester, etc., the new derivative can be polymerized to insoluble, infusible polymers.

A few examples of such typical monomers which polymerize to insoluble, infusible polymers are

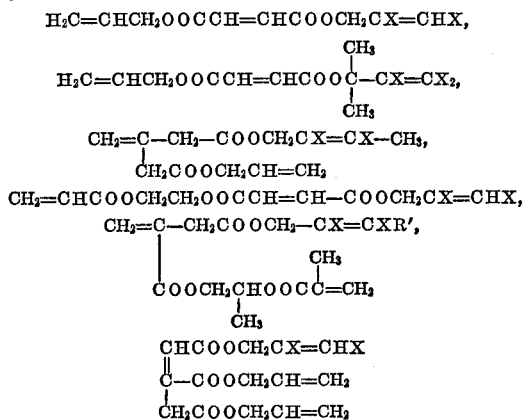

etc.

The monomers of this invention containing a

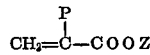

group, wherein P represents hydrogen, methyl, chlorine, bromine, cyano and phenyl, homopolymerize readily with radical initiation such as by means of a peroxy compound, ultraviolet light or ionizing radiation, whereas those monomers having substitution on the alpha and beta carbon atoms homopolymerize under radical initiation less readily and in some cases not at all, but copolymerize readily according to their reactivity and selective constants, $r_1$ and $r_2$. The homopolymerizations and copolymerizations may be performed (1) in mass, that is, neat, in the absence of added solvents or dispersion media; (2) in suitable organic substances which are solvents for the monomers as well as the polymers, or which are solvents for the monomers and not for the polymers, in which cases the polymers precipitate from the media; or (3) in emulsion systems which are well known in the art and which comprise an emulsifying agent such as soaps, synthetic emulsifiers, such as dodecylbenzene sulfonate sodium salts, sodium sulfodioctylsuccinate and the like, in water. In the emulsion systems water soluble radical initiators such as potassium persulfate, hydrogen peroxide, sodium perborate, urea peroxide, etc., are used alone or in the presence of a redox agent, such as sulfur dioxide, sodium bisulfite, ferrous sulfate, etc.

Thus, the polymers and copolymers of this invention can be prepared by the vinyl type polymerization by means of radical initiators such as the peroxy and azo catalysts as such or as redox systems as well as by ultraviolet and ionizing radiation. Of the azo-type catalysts, azobisisobutyronitrile is a typical example and is usually preferred. The peroxy catalysts are illustrated by stearoyl, lauroyl and butyroyl peroxide, but for economic reasons benzoyl peroxide, tertiary-butyl peroxide and tertiary-butyl peracetate are selected, but, any of the other well-known peroxy catalysts such as cumene peroxide and the like can also be used.

When solutions of the polymers are desired, they can be obtained readily by polymerization in a suitable organic solvent or a mixture of organic solvents such as methyl acetate, ethyl acetate, acetone, methylethyl ketone, methylisobutyl ketone, benzene, toluene, xylene, dioxane, tetrahydrofuran, chloroform, carbon tetrachloride, ethylenedichloride, dibutyl ether, etc. In such cases a solution of 5 to 75% of the monomer in the solvent is used.

When low molecular weight polymers are desired, the amount of radical initiator used may be as high as 3 to 4 percent by weight of the monomer or comonomers used; and the molecular weight may be further controlled by the use of radical chain transfer agents such as chloroform, carbon tetrachloride, octyl mercaptan, dodecyl mercaptan and the like. When high molecular weight polymerization products are desired, the polymerizations are performed preferably in the absence of chain transfer agents and only sufficient initiator to overcome the induction period of the system, such as of the order of 0.025 to 0.1% by weight of the initiator.

Alternately, the polymerization may be achieved thermally, simply by heating to generate the initiating radicals. The polymerization can be performed over a wide range of temperatures depending upon whether the system used is a mass, a solution or an emulsion polymerization and whether the initiation is by a redox system, ultraviolet or ionizing radiation. With ionizing radiation, polymerization can be achieved at temperatures as low as −40° C., but usually at ambient temperatures. The redox polymerizations can be performed at 0 to 70° C., and the thermal polymerizations can be performed up to temperatures of the order of 75 to 125° C. or higher.

The new monomers of this invention can be copolymerized with other vinyl monomers such as the acrylic and methacrylic esters such as the methyl, ethyl, propyl, butyl, hexyl, cyclohexyl, dodecyl, etc. esters. In addition to, or in lieu of these acrylic type esters used in such copolymerizations, any other copolymerizable monovinyl or monovinylidene comonomer or mixtures thereof can be used, for example, the vinyl esters that is vinyl acetate, and the monovinyl esters of saturated and unsaturated, aliphatic, monobasic and polybasic acids, and more specifically the vinyl esters of the following acids: propionic, isobutyric, valeric, caprylic, caproic, oleic, stearic, acrylic, methacrylic, crotonic, oxalic, malonic, succinic, glutaric, adipic, suberic, azelaic, maleic, fumaric, itaconic, mesaconic, hexahydrobenzoic, citric, trimesic, etc., as well as the corresponding allyl, methallyl, etc. esters of the aforementioned acids, acrylonitrile, methacrylonitrile, methacrylic acid, hydroxy propyl methacrylate, etc.; amides such as acrylic amide; itaconic acid monoesters and diesters, such as the methyl, ethyl, butyl, allyl esters, the maleic and fumaric acid monoesters, diesters and their amide and nitrile compounds, such as diethyl maleate, maleyl diamide, itaconamide, fumaryl dinitrile, dimethyl fumarate, etc.; ethers, such as methallyl ethyl ether, vinyl ethyl ether, vinyl butyl ether, allyl propyl ether, vinyl cyclohexyl ether; cyanuric acid derivatives having one copolymerizable unsaturated group attached directly or indirectly to the triazine ring, such as allyl diethyl cyanurate, vinyl diethyl cyanurate; the dienes such as butadiene, isoprene, etc.; as well as the partial, soluble or fusible polymerizable polymers of the hereinabove listed monomers, etc.

Typical suitable aromatic comonomers include vinyl aryl compounds such as styrene, vinyl naphthalene, vinyl toluene, vinyl xylene, vinyl phenol, vinyl ethyl benzene, vinyl dimethyl naphthalene, vinyl diphenyl, etc., chlorostyrenes, etc., vinyl phenyl ether, vinyl benzoate, vinyl naphthoate, vinyl methyl phthalate, allyl ethyl phthalate, allyl propyl phthalate, etc.

The polymeric compositions of this invention are particularly useful as coating compositions on all types of substrates, including cellulose in its various forms, such as paper, wood, paper board, wood board, wood pulp, regenerated cellulose in film or fiber form, laminates of various types including those prepared from fibrous fillers bonded with urea, melamine, epoxy and polyester resins, plaster board, concrete in its various forms such as slabs, blocks and the like. They may also be used as impregnants for porous bodies such as the compositions hereinabove named, as well as for synthetic and natural sponges, etc. Particularly do they find use as bonding agents and adhesives for solid, porous and foamed bodies. They can be used alone or admixed with each other or with other copolymerizable monomers, unsaturated or saturated polymers, in the absence or presence of dyes, pigments, plasticizers. For coating, impregnating or adhesive compositions where the presence of small amounts of solvents in the cured composition is not objectionable they can be mixed with volatile or non-volatile solvents best suited to the particular application.

The polymers of this invention are also useful in the preparation of copolymers with unsaturated alkyd resins. In carrying this portion of the invention into effect, an esterification product of a polyhydric alcohol and an alpha, alpha-unsaturated polycarboxylic acid is first prepared in accordance with techniques now well known to those skilled in the alkyd resin art, such as ethylene glycol maleate, propylene glycol maleate, ethylene glycol maleate-phthalate, ethylene glycol maleate-acrylate, propylene glycol-fumarate-methacrylate and the like.

In many cases, instead of copolymerizing a single monomer of this invention with a single alkyd resin, mixtures can be used of two or more such monomers with a single alkyd resin, or a single monomer can be used with two or more alkyd resins, or a mixture of two or more monomers with two or more alkyd resins.

The polymers of this invention can be used alone or with fillers, dyes, pigments, opacifiers, lubricants, plasticizers, natural and synthetic resins or other modifying bodies in, for example, casting, molding, laminating, coating applications, and as adhesives, impregnants and protective coatings.

In preparing copolymers, the monomers of this invention can constitute as much as 98 to 99.5% by weight of the whole, or the modifying comonomer or alkyd resin can constitute 98 to 99.5% of the whole.

In general, the proportions of the components used in a particular formulation will depend upon the particular properties desired in the interpolymer. For most applications, it is preferred to use 20 to 80 percent of the monomers of this invention and from 80 to 20 percent of the modifying polymer or monomer, since within these ranges interpolymers best adapted for most commercial applications can be produced.

Within these ranges the new interpolymers have a wide range of properties. For example, depending upon the particular crosslinking polymer and any modifying polymer or monomer, the particular proportions thereof, the conditions of polymerization, such as the temperature, pressure, presence or absence of additives, etc., and the extent of polymerization, they can vary from soft flexible bodies to hard rigid masses of varying resistance to solvents.

For coating or impregnating applications where the presence of a small amount of solvent in the cured composition is not objectionable, the mixed starting component can be diluted with volatile or non-volatile solvents or diluents best suited for the particular service application, and then can be polymerized after the application of the solution to the particular article to be coated or impregnated, or impregnated and coated. By suitable selection of the starting material and the conditions of interpolymerization, interpolymers can be obtained in an insoluble, infusible state practically resistant to the destructive effect of other chemical bodies such as acid, bases, salts, solvents, swelling agents, and the like.

When it is desired to modify the properties of the crosslinkable monomers of this invention, this can be accomplished by copolymerizing a mixture comprising at least one such polymer with at least one copolymerizable monomer containing at least one unsaturated ethylenic, or acetylenic hydrocarbon radical, more particularly, a $CH_2=C<$ radical, such as vinyl, allyl, methallyl, vinylidene, etc., or with a copolymerizable compound containing a $—CH=CH—$, or a $—CH=C<$, or a $>C=C<$ grouping, for example as in vinylidene fluoride, vinylidene cyanide, vinyl propionate, maleic anhydride, or its esters and amides, methyl maleic anhydride, tetrafluoroethylene, etc.

In preparing copolymers of the crosslinkable monomers with polymerizable comonomers such as methyl methacrylate, styrene, acrylonitrile, and the like, the crosslinkable polymer can constitute as little as 0.1 percent by weight of the whole, whereas in other cases the crosslinkable polymers can constitute as much as 98 to 99 percent of the whole. The proportion of the components in a particular formulation will depend upon the particular comonomers used and the particular properties desired in the copolymer. The polymers and copolymers can be prepared most readily by ionizing radiation.

The acrylic monomers of this invention, particularly those having the structures

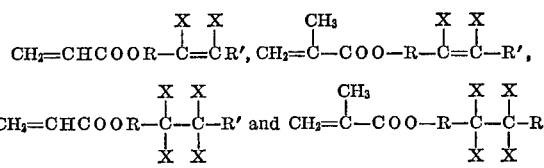

are particularly suited for grafting to polymers in fiber form, by techniques well known in the art to render the fibers non-burning, such as to fibers or textiles of the nylon, polyvinyl alcohol, regenerated cellulose, cotton, etc. They are particularly useful in this respect for cellulose fibers and fabric such as derived from rayon or cotton. One particularly useful method is to form a redox metal complex of the acidic cellulose, or, of the reaction product of cellulose with carbon bisulfide, and to graft the monomer directly to the cellulose.

Various methods of practicing the invention are illustrated by the following examples. These examples are intended merely to illustrate the invention and not in any sense to limit the manner in which the invention can be practiced. The parts and percentages recited therein and all through this specification, unless specifically provided otherwise, refer to parts by weight and percentages by weight.

EXAMPLE I

One hundred forty-five parts of 1,2,3-trichloroprene are added to a solution of 106 parts of sodium carbonate dissolved in 900 parts of water and the mixture refluxed for ten hours. The water layer is then separated from the oily layer which is dried over anhydrous sodium carbonate, separated by filtration and distilled. There is obtained 115 parts of 2,3-dichloro-2-propene-1-ol, $ClCH=CClCH_2OH$ (I), B.P. 45–46° C./1.5 mm.; yield, 91%.

EXAMPLE II

To 250 parts of carbon tetrachloride is added 56 parts of propargyl alcohol (A) and to this solution there is added slowly, at room temperature, a solution of 160 parts of bromine in 250 parts of carbon tetrachloride and allowed to react at room temperature for two hours, then the mixture is heated to 30–40° C. for two hours. The mixture is then distilled to recover the carbon tetrachloride and the 2,3-dibromo-2-propene-1-ol, $BrCH=CBrCH_2OH$ (II), B.P. 51–52° C./0.7 mm.; yield, 93%.

Treatment of 1,2,3-tribromopropene with aqueous sodium carbonate by the procedure of Example I yields the same 2,3-dibromo-2-propene-1-ol.

EXAMPLE III

The reaction of 2-methyl-3-butyn-2-ol (B) with NaOCl under an inert atmosphere of nitrogen according to the procedure given in the Bull. Soc. Chim. (France), p. 1615 (1965), gives an 87% yield of 4-chloro-2-methyl-3-butyl-2-ol,

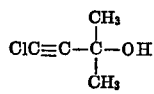

B.P. 54–56° C./18 mm.

EXAMPLE IV

The reaction of 2-methyl-3-butyl-2-ol in water with $Br_2$ and NaOH by the procedure given in Ann. Chem. (Rome), 47, 118 (1957), yields 4-bromo-2-methyl-3-butyn-2-ol,

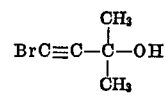

B.P. 92–93° C./ 22 mm.

EXAMPLE V

The procedure of Example IIa is repeated using instead of propargyl alcohol, one equivalent weight of the following acetylenic alcohols to obtain the halo-derivative corresponding to the alcohol used:

| Acetylenic alcohol | | Dibromoethylene derivative | |
|---|---|---|---|
| $HC{\equiv}C-\underset{\underset{OH}{\mid}}{\overset{\overset{CH_3}{\mid}}{C}}H$ | (C) | $H\overset{Br}{\overset{\mid}{C}}{=}\overset{Br}{\overset{\mid}{C}}-\underset{\underset{OH}{\mid}}{\overset{\overset{CH_3}{\mid}}{C}}H$ | (V) |
| $HC{\equiv}C-\underset{\underset{OH}{\mid}}{\overset{\overset{C_2H_5}{\mid}}{C}}H$ | (D) | $H\overset{Br}{\overset{\mid}{C}}{=}\overset{Br}{\overset{\mid}{C}}-\underset{\underset{OH}{\mid}}{\overset{\overset{C_2H_5}{\mid}}{C}}H$ | (VI) |
| $HC{\equiv}C-\underset{\underset{OH}{\mid}}{\overset{\overset{C_3H_7}{\mid}}{C}}H$ | (E) | $H\overset{Br}{\overset{\mid}{C}}{=}\overset{Br}{\overset{\mid}{C}}-\underset{\underset{OH}{\mid}}{\overset{\overset{C_3H_7}{\mid}}{C}}H$ | (VII) |
| $HC{\equiv}C-\underset{\underset{OH}{\mid}}{\overset{\overset{C_4H_9}{\mid}}{C}}H$ | (F) | $H\overset{Br}{\overset{\mid}{C}}{=}\overset{Br}{\overset{\mid}{C}}-\underset{\underset{OH}{\mid}}{\overset{\overset{C_4H_9}{\mid}}{C}}H$ | (VIII) |
| $HC{\equiv}C-\underset{\underset{OH}{\mid}}{\overset{\overset{C_8H_{17}}{\mid}}{C}}H$ | (G) | $H\overset{Br}{\overset{\mid}{C}}{=}\overset{Br}{\overset{\mid}{C}}-\underset{\underset{OH}{\mid}}{\overset{\overset{C_8H_{17}}{\mid}}{C}}H$ | (IX) |
| $HC{\equiv}C-\underset{\underset{OH}{\mid}}{\overset{\overset{C_6H_5}{\mid}}{C}}H$ | (H) | $H\overset{Br}{\overset{\mid}{C}}{=}\overset{Br}{\overset{\mid}{C}}-\underset{\underset{OH}{\mid}}{\overset{\overset{C_6H_5}{\mid}}{C}}H$ | (X) |
| $HC{\equiv}\underset{\underset{CH_3}{\mid}}{\overset{\overset{CH_3}{\mid}}{C}}-OH$ | (B) | $H\overset{Br}{\overset{\mid}{C}}{=}\overset{Br}{\overset{\mid}{C}}-\underset{\underset{CH_3}{\mid}}{\overset{\overset{CH_3}{\mid}}{C}}-OH$ | (XI) |
| $HC{\equiv}C-\underset{\underset{C_2H_5}{\mid}}{\overset{\overset{CH_3}{\mid}}{C}}-OH$ | (I) | $H\overset{Br}{\overset{\mid}{C}}{=}\overset{Br}{\overset{\mid}{C}}-\underset{\underset{C_2H_5}{\mid}}{\overset{\overset{CH_3}{\mid}}{C}}-OH$ | (XII) |
| $HC{\equiv}C-\underset{\underset{C_4H_9}{\mid}}{\overset{\overset{CH_3}{\mid}}{C}}-OH$ | (J) | $H\overset{Br}{\overset{\mid}{C}}{=}\overset{Br}{\overset{\mid}{C}}-\underset{\underset{C_4H_9}{\mid}}{\overset{\overset{CH_3}{\mid}}{C}}-OH$ | (XIII) |
| $HC{\equiv}C-\underset{\underset{C_4H_9}{\mid}}{\overset{\overset{C_4H_9}{\mid}}{C}}-OH$ | (K) | $H\overset{Br}{\overset{\mid}{C}}{=}\overset{Br}{\overset{\mid}{C}}-\underset{\underset{C_4H_9}{\mid}}{\overset{\overset{C_4H_9}{\mid}}{C}}-OH$ | (XIV) |
| $H_3C-C{\equiv}C-CH_2OH$ | (L) | $CH_3\overset{Br}{\overset{\mid}{C}}{=}\overset{Br}{\overset{\mid}{C}}-CH_2OH$ | (XV) |
| $H_3C-C{\equiv}C-CH_2CH_2OH$ | (M) | $CH_3\overset{Br}{\overset{\mid}{C}}{=}\overset{Br}{\overset{\mid}{C}}-CH_2CH_2OH$ | (XVI) |
| $C_6H_5C{\equiv}C(CH_2)_{10}OH$ | (N) | $C_6H_5\overset{Br}{\overset{\mid}{C}}{=}\overset{Br}{\overset{\mid}{C}}-(CH_2)_{10}OH$ | (XVII) |
| $H_{41}C_{20}C{\equiv}C-CH_2OH$ | (O) | $H_{41}C_{20}\overset{Br}{\overset{\mid}{C}}{=}\overset{Br}{\overset{\mid}{C}}-CH_2OH$ | (XVIII) |
| $H_3CC{\equiv}C-CH_2\overset{\overset{CH_3}{\mid}}{C}H-OH$ | (P) | $H_3C\overset{Br}{\overset{\mid}{C}}{=}\overset{Br}{\overset{\mid}{C}}-CH_2\overset{\overset{CH_3}{\mid}}{C}HOH$ | (XIX) |
| $C_4H_9C{\equiv}C-CH_2OH$ | (Q) | $H_9C_4\overset{Br}{\overset{\mid}{C}}{=}\overset{Br}{\overset{\mid}{C}}-CH_2CHOH$ | (XX) |

TABLE—Continued

| Acetylenic alcohol | | Dibromoethylene derivative | |
|---|---|---|---|
| $C_6H_5C\equiv C-CH_2OH$ | (R) | $C_6H_5\underset{\|}{C}=\underset{\|}{\overset{Br}{C}}-CH_2OH$ with Br,Br | (XXI) |
| $C_6H_5C\equiv C-CH_2CH_2OH$ | (S) | $C_6H_5\underset{\|}{C}=\underset{\|}{\overset{Br}{C}}-CH_2CH_2OH$ with Br,Br | (XXII) |
| $C_6H_{11}C\equiv C-CH_2OH$ | (T) | $C_6H_{11}\underset{\|}{C}-\underset{\|}{\overset{Br}{C}}-CH_2OH$ with Br,Br | (XXIII) |
| $C_6H_5C\equiv C-\underset{\|}{\overset{CH_3}{C}}H-OH$ | (U) | $C_6H_5\underset{\|}{C}=\underset{\|}{\overset{Br}{C}}-\underset{\|}{\overset{CH_3}{C}}HOH$ with Br,Br | (XXIV) |
| $C_6H_5C\equiv C-\underset{\underset{CH_3}{\|}}{\overset{CH_3}{\overset{\|}{C}}}-OH$ | (V) | $C_6H_5\underset{\|}{C}=\underset{\underset{CH_3}{\|}}{\overset{CH_3}{\overset{\|}{C}}}-\underset{\|}{\overset{Br}{C}}-OH$ | (XXV) |
| $ClC\equiv C-\underset{\underset{CH_3}{\|}}{\overset{CH_3}{\overset{\|}{C}}}-OH$ | (III) | $ClC=\underset{\underset{CH_3}{\|}}{\overset{CH_3}{\overset{\|}{C}}}-\underset{\|}{\overset{Br}{C}}-OH$ with Br,Br | (XXVI) |
| $BrC\equiv C-\underset{\underset{CH_3}{\|}}{\overset{CH_3}{\overset{\|}{C}}}-OH$ | (IV) | $BrC=\underset{\underset{CH_3}{\|}}{\overset{CH_3}{\overset{\|}{C}}}-\underset{\|}{\overset{Br}{C}}-OH$ with Br,Br | (XXVII) |
| $C_{10}H_7C\equiv CCH_2OH$ | (W) | $C_{10}H_7\underset{\|}{C}=\underset{\|}{\overset{Br}{C}}-CH_2OH$ with Br,Br | (XXVIII) |

EXAMPLE VI (a) Into a solution of 56 parts of propargyl alcohol and 0.1 part of iodine in 300 parts of tetrachloroethylene is slowly passed chlorine gas while exposed to an ultraviolet lamp until 70 parts of chlorine are reacted. The halogenated product is then recovered by distillation and the majority of the product is identical to the 2,3-dichloro-2-propene-1-ol of Example I.

(b) In a similar manner there is prepared

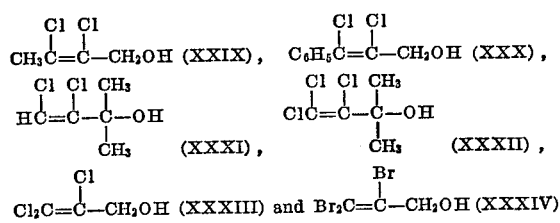

$CH_3\underset{\|}{\overset{Cl}{C}}=\underset{\|}{\overset{Cl}{C}}-CH_2OH$ (XXIX), $C_6H_5\underset{\|}{\overset{Cl}{C}}=\underset{\|}{\overset{Cl}{C}}-CH_2OH$ (XXX), $H\underset{\|}{\overset{Cl}{C}}=\underset{\underset{CH_3}{\|}}{\overset{Cl}{\overset{\|}{C}}}-\underset{\|}{\overset{CH_3}{C}}-OH$ (XXXI), $Cl\underset{\|}{\overset{Cl}{C}}=\underset{\underset{CH_3}{\|}}{\overset{Cl}{\overset{\|}{C}}}-\underset{\|}{\overset{CH_3}{C}}-OH$ (XXXII), $Cl_2C=\underset{\|}{\overset{Cl}{C}}-CH_2OH$ (XXXIII) and $Br_2C=\underset{\|}{\overset{Br}{C}}-CH_2OH$ (XXXIV)

EXAMPLE VII

A mixture of 127 parts of 2,3-dichloropropene-1-ol, 86 parts of methacrylic acid, 400 parts of toluene, 0.50 part of toluene sulfonic acid and 1 part of tertiary-butyl catechol are reacted at reflux in a Dean-Stark apparatus under a nitrogen atmosphere until about 18 parts of water are collected in the trap. Then a saturated aqueous solution of sodium carbonate is added to the reaction mixture to neutralize the acid, the aqueous layer is separated from the mixture which is again washed with distilled water, the benzene layer is then separated, dried over anhydrous sodium carbonate and filtered. The filtrate is distilled at reduced pressure to remove the benzene and to remove the ester. There is obtained a 93% yield of

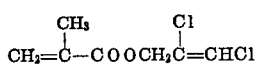

$CH_2=\underset{\|}{\overset{CH_3}{C}}-COOCH_2\underset{\|}{\overset{Cl}{C}}=CHCl$ B.P. 40–41° C./0.20 mm. Hg. Analysis for chlorine gives a value of 41.8% which is in close agreement with the theoretical value.

EXAMPLE VIII

The procedure of Example VII is repeated except that instead of the 2,3-dichloropropene-1-ol, there is used 200 parts of 2,3-dibromopropene-1-ol and there is obtained

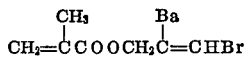

$CH_2=\underset{\|}{\overset{CH_3}{C}}COOCH_2\underset{\|}{\overset{Br}{C}}=CHBr$ B.P. 56–57° C./0.15 mm. Hg. Analysis gives a value of 58.8% bromine which is in good agreement with the calculated value.

EXAMPLE IX

The procedure of Example VII is repeated using instead of the 2,3-dichloropropene-1-ol an equivalent quantity of

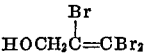

$HOCH_2\underset{\|}{\overset{Br}{C}}=CBr_2$ and there is obtained the ester,

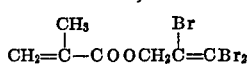

$CH_2=\underset{\|}{\overset{CH_3}{C}}-COOCH_2\underset{\|}{\overset{Br}{C}}=CBr_2$ Similarly, $HOCH_2CCl=CCl_2$ yields the ester

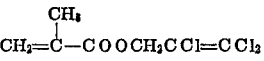

$CH_2=\underset{\|}{\overset{CH_3}{C}}-COOCH_2CCl=CCl_2$

EXAMPLE X

The procedures of Examples VII, VIII and IX are repeated using 72 parts of acrylic acid instead of methacrylic acid and there are obtained the acrylic esters, $CH_2=CHCOOCH_2CCl=CHCl$, $CH_2=CHCOOCH_2CBr=CHBr$,

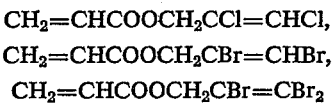

$CH_2=CHCOOCH_2CBr=CBr_2$ and $CH_2CHCOOCH_2CCl=CCl_2$ respectively.

EXAMPLE XI

A mixture of 98 parts of maleic anhydride, 127 parts of 2,3-dichloropropene-1-ol and 400 parts of dry benzene are reacted at 80° C. for twenty-four hours and the mixture cooled to 5° C. Crystals of the half-ester product are removed by filtration and dried in a vacuum oven. There is obtained 213.8 g. (95% yield) of

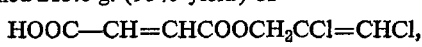

$HOOC-CH=CHCOOCH_2CCl=CHCl$, which on analysis shows 31.5% chlorine which is in good agreement with the theoretical value.

Substitution of an equivalent quantity of 2,3-dibromopropene-1-ol for the 2,3-dichloropropene-1-ol yields the corresponding ester,

HOOCCH—CHCOOCH₂CBr=CHBr

EXAMPLE XII

The procedure of Example XI is repeated using 112 parts of itaconic anhydride instead of the maleic anhydride and there is obtained the ester,

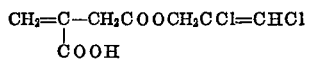
CH₂=C—CH₂COOCH₂CCl=CHCl
   |
   COOH

EXAMPLE XIII

To a mixture of 800 parts of dry benzene, 127 parts of 2,3-dichloropropene-1-ol and 101 parts of triethylamine cooled to 5° C. is added slowly with stirring 148 parts of methyl fumaryl chloride, H₃COOCCH=CHCOCl, over a period of one and one-half hours. The mixture is then filtered to remove the triethylamine hydrochloride and hexane is added to the filtrate until it becomes turbid. The solution is filtered, decolorized with charcoal and the solvent removed from the filtrate at 15 mm. Hg pressure, leaving as a clear viscous oil, the product H₃COOCCH=CHCOOCH₂CCl—CHCl.

When 174 parts of allyl fumaryl chloride are used instead of methyl fumaryl chloride, there is obtained the ester, H₂C=CHCH₂OOCCH=CHCOOCH₂Cl—CHCl₂.

EXAMPLE XIV

The procedure of Example XIII is repeated using 105 parts of methacrylyl chloride instead of the methyl fumaryl chloride and there is obtained the methacrylic ester,

    CH₃
     |
CH₂=C—COOCH₂CCl=CHCl identical to that of Example VII.

Substitution of 95 parts of acrylyl chloride instead of the methyl fumaryl chloride of Example XIII yields the acrylic ester, CH₂=CHCOOCH₂CCl=CHCl, identical to that of Example X.

EXAMPLE XV (a) The procedure of Example VII is repeated using 225 parts of HOOCCH=CH₂CHCOOCH₂CCl=CHCl instead of the methacrylic acid and there is obtained 297 parts of the ester,

CHCOOCH₂CCl=CHCl
‖
CHCOOCH₂Cl=CHCl (b) When 239 parts of

CH₃
    ‖
HOOCC—COOCH₂CCl—CHCl are used instead of the methacrylic acid of Example XV(a), there is obtained 30 parts of the itaconic ester,

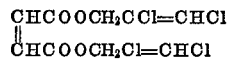
CH₂=COOCH₂CCl=CHCl
     ‖
     CH₂COOCH₂CCl=CHCl

EXAMPLE XVI

The following unsaturated polyesters are prepared, as illustrative of the class of unsaturated alkyd resins, by heating the ingredients in an inert nitrogen or carbon dioxide atmosphere.

Alkyd resin A.—Ethylene glycol maleate

|  | Parts by weight |
|---|---|
| Ethylene glycol | 68.2 |
| Maleic anhydride | 98.0 |

The components are mixed and slowly heated in the course of one hour to 190° C. and held at this temperature for four to six hours, until the acid number is reduced to below 40.

Alkyd resin B.—Ethylene glycol-maleate-phthalate

|  | Parts by weight |
|---|---|
| Ethylene glycol | 68.2 |
| Maleic anhydride | 49.0 |
| Phthalic anhydride | 74.0 |

The compounds are mixed and heated according to the procedure given above for alkyd resin A.

Alkyd resin C

|  | Parts by weight |
|---|---|
| Propylene glycol | 68.2 |
| Maleic anhydride | 65.0 |
| Tetrabromophthalic anhydride | 140.0 |

The compounds are mixed and heated slowly to 190° C. and held at this temperature for three hours, then raised to 200° C. until the acid number is at least 40 or lower.

EXAMPLE XVII

Esterification of alcohols V to XXXIV by the procedure of Example VII or of Example XIV yields the corresponding methacrylic esters,

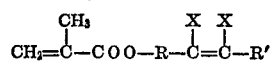
    CH₃          X  X
     |           |  |
CH₂=C—COO—R—C=C—R'

EXAMPLE XVIII (a) Post halogenation of 63 parts of 3,3-dichloro-2-propene-1-ol by 80 parts bromine by the procedure of Example II(a) yields the alcohol,

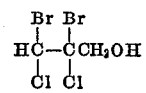
  Br Br
   |  |
HC—CCH₂OH
   |  |
  Cl Cl which by the procedure of Example VII is converted to the methacrylic ester,

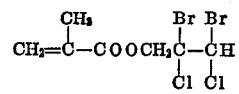
    CH₃       Br Br
     |        |  |
CH₂=C—COOCH₂C—CH
              |  |
             Cl Cl (b) By the two-step procedure of Example XVII(a) above, the monomers V to XXVIII inclusive are readily converted to the methacrylic and acrylic esters,

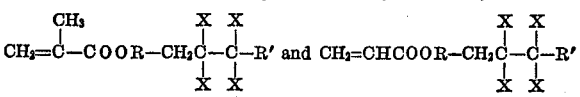
    CH₃       X X                              X X
     |        | |                              | |
CH₂=C—COOR—CH₂C—C—R'  and  CH₂=CHCOOR—CH₂C—C—R'
              | |                              | |
              X X                              X X

EXAMPLE XIX

Substitution of 161 parts of the fumaryl amide chloride, (H₃C)₂NOCCH=CHCOCl for the methyl fumaryl chloride in Example XIII yields the amide ester,

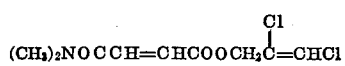
                          Cl
                          |
(CH₃)₂NOCCH=CHCOOCH₂C=CHCl

EXAMPLE XX (a) To 50 parts of

    CH₃       Br
     |        |
CH₂=C—COOCH₂C=CHBr in a glass tube is added 0.5 part of benzoyl peroxide and the mixture stirred at 25° C. until the radical initiator is dissolved; the tube sealed under nitrogen and heated at 80° C. for twenty-four hours and at 100° C. for eighteen hours. There was obtained a clear, almost water-white rubbery polymer. When a sample of the polymer is ignited it does not continue to burn. The polymer is readily soluble in chloroform, ethylene dichloride and benzene.

(b) Fifty parts of

is polymerized as in Example XX(a). When ignited the polymer continues to burn with difficulty, but when the polymerization is repeated by first adding 5 parts of trimethyl phosphite to the monomer and the mixture polymerized, the resulting polymer, when ignited, does not continue to burn. In contrast, when a mixture of 50 parts of methyl methacrylate and 5 parts of trimethyl phosphite is polymerized, the resulting polymer continues to burn when ignited.

(c) Fifty parts of

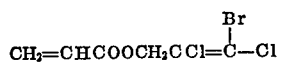

is polymerized by the procedure given in Example XX(a) and the resulting polymer has self-extinguishing properties.

(d) Fifty parts of

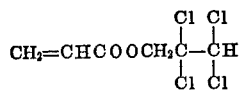

is polymerized by the procedure given in Example XX(a) above, and the resulting polymer does not continue to burn when ignited.

(e) Polymerization of monomers V to XXXIV by the procedure of Example XX(a) or XX(b) yield soluble, self-extinguishing polymers.

(f) The acrylic esters,

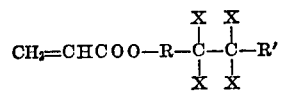

of Example XVIII(b) are converted to soluble, self-extinguishing polymers by the procedure of Example XX(a).

(g) The methacrylic esters,

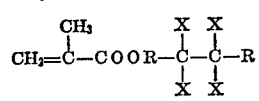

of Example XVIII(b) are converted to soluble, self-extinguishing polymers by the procedure of Example XX(a).

EXAMPLE XXI (a) A mixture of 94 parts of methyl methacrylate and 6 parts of

is copolymerized by the procedure of Example XX(a) and the resulting copolymer is self-extinguishing when ignited. The copolymer is soluble in chloroform, benzene and toluene.

(b) A mixture of 92 parts of methacrylate and 8 parts of

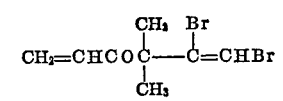

is copolymerized by the procedure of Example XX(a) and a self-extinguishing copolymer is obtained.

EXAMPLE XXII

The procedure of Example XXI(b) is repeated six times using instead of methyl methacrylate, 92 parts of each of the following: methylacrylate, styrene, acrylonitrile, vinyl acetate, beta-cyano-ethyl methacrylate, vinyl chloroacetate, and in all cases self-extinguishing polymers are obtained.

EXAMPLE XXIII (a) To each of 50 parts of alkyd resins A, B and C respectively are added 50 parts of

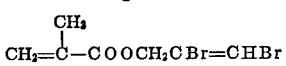

and 0.20 part of tertiary butyl hydroperoxide; then fiberglass mats are impregnated with these solutions according to procedures well known in the art to 45% resin contents. A 3-ply laminate is prepared and placed between two layers of polyethylene film and cured for two hours at 100° C. and four hours at 125° C. The cured laminates when tested for flame-resistant properties by A.S.T.M. Method D-635-44 are found to be non-burning and self-extinguishing.

(b) The procedure of Example XXIII(a) is repeated but 30 parts of the

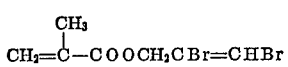

is replaced in four separate tests by 30 parts styrene, methyl methacrylate, vinyl acetate and triallyl cyanurate respectively, and in all cases non-burning, self-extinguishing laminates are obtained.

(c) The procedures of Examples XXIII(a) and XXIII(b) are repeated using instead of

the monomers

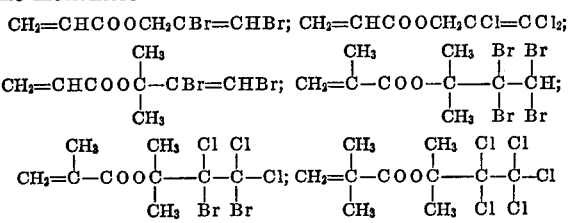

and in all cases, self-extinguishing, non-burning laminates are obtained.

EXAMPLE XXIV

To 100 parts of $CH_2=CHCOOCH_2CCl=CHCl$ there is added at room temperature one part of $AlCl_3$ and a dark-brown, almost black colored gel is obtained with the elimination of HCl.

EXAMPLE XXV

The following mixtures are first prepared:

| | | Parts |
|---|---|---|
| (A) | Methyl methacrylate | 75 |
| | $CH_2=\overset{CH_3}{\underset{}{C}}-COO\overset{CH_3}{\underset{CH_3}{C}}-CBr=CHBr$ | 24 |
| | Benzophenone | 0.2 |
| (B) | Methyl methacrylate | 75 |
| | $CH_2=\overset{CH_3}{\underset{}{C}}-COOCH_2-\overset{Br}{\underset{CH_3}{C}}Br=\overset{}{C}Cl$ | 20 |
| | $CH_2=\overset{CH_3}{\underset{}{C}}-COOCH_2CH_2OOC\overset{CH_3}{\underset{}{C}}=CH_2$ | 4 |
| | Benzophenone | 0.1 | and then irradiated with ultraviolet light from a 100-watt mercury lamp until the mixture becomes solid. In both cases, self-extinguishing non-burning copolymers are obtained. Copolymer (B) is insoluble and infusible due to the crosslinking monomers.

EXAMPLES XXVI

The following mixtures are first prepared:

|  | Parts |
|---|---|
| (A) $CH_2=CHCOOCH_2CBr=CHBr$ | 20 |
| $CH_2=\overset{CH_3}{\underset{|}{C}}-COOCH_3$ | 60 |
| $CH_2=CHCOOCH_2\underset{\underset{OH}{|}}{CH}-CH_2OOCHC=CH_2$ | 20 |
| (B) $CH_2=\overset{CH_3}{\underset{|}{C}}-COO\overset{CH_3}{\underset{\underset{CH_3}{|}}{C}}-CBr=CHBr$ | 20 |
| $(CH_2=CHCOOCH_2\underset{\underset{OH}{|}}{CH}-CH_2OC_6H_4)_2C(CH_3)_2$ | 10 |
| $CH_2=\overset{CH_3}{\underset{|}{C}}-COOCH_3$ | 50 |
| (C) $CH_2=CHCOOCH_2CCl=CHCl$ | 15 |
| $PO(CH_2CBr=CHBr)_3$ | 10 |
| $(CH_2=\overset{CH_3}{\underset{|}{C}}-COO)_2C_4H_8$ | 5 |
| $CH_2=\overset{CH_3}{\underset{|}{C}}-COOC_2H_5$ | 20 |
| $CH_2=\overset{CH_3}{\underset{|}{C}}-COOCH_3$ | 70 |
| (D) Alkyd Resin B | 50 |
| $CH_2=CHCOOCH_2CBr=CHBr$ | 30 |
| $CH_2=\overset{CH_3}{\underset{|}{C}}-COOCH_2\underset{\underset{OH}{|}}{CH}-\underset{\underset{OH}{|}}{CH_2}$ | 10 |
| $CH_2=CHCH_2OOCCH=CHCOO\overset{CH_3}{\underset{\underset{CH_3}{|}}{C}}-CBr=CHBr$ | 35 |
|  | 5 |
| (E) $CH_2=CH-COOCH_2CCl=CHCl$ | 20 |
| $P(OCH_2CH=CH_2)_3$ | 20 |
| $(CH_2=CHCOOCH_2)_2$ | 20 |

Samples of mixtures (A), (B), (C), (D) and (E) are placed in glass vials which are swept out with nitrogen and sealed, and then exposed to the beam of a 1 mev. Van der Graaf accelerator and insoluble, infusible, non-burning, self-extinguishing polymers are obtained at dosages varying from 4 to 10 megarads. Similar results are obtained when other sources of ionizing radiation are used, such as from natural or synthetic radioactive material, for example, from cobalt-60 or from the Varian type travelling wave linear accelerators or the types of accelerators described in U.S. Pat. 2,763,609 and British Pat. 762,953.

When 20 ml. wood ply is impregnated and saturated with the mixtures (A), (B), (C), (D) and (E), and then covered with 0.1 ml. polyethylene sheet and irradiated to 6 megarads as above, and the polyethylene barrier sheet removed, the resulting cured, impregnated wood is found to be dense, water resistant, self-extinguishing and non-burning.

EXAMPLE XXVII

A skein of 40 parts of cotton thread is placed in 1000 parts of an aqueous solution containing 50 parts of NaOH, 5.0 parts of $CS_2$ and 0.10 part of sodium dodecylbenzenesulfonate and allowed to stand for 30 minutes. The skein is then removed, washed thoroughly with distilled water and immersed in 1000 parts of solution containing 0.2 part of $FeSO_4 \cdot (NH_4)_2SO_4$ and 3.0 parts of tetra-bis-hydroxymethyl phosphonium chloride for 10 minutes. The skein is then washed with distilled water and suspended in 2000 parts of an emulsion containing 24 parts of $$\left(CH_2=CHCOOCH_2CBr\right)_2$$

0.2 part of sodium dodecylbenzenesulfonated and 3.0 parts of hydrogen peroxide and the mixture heated with agitation at 60–70° C. under nitrogen for 3 hours following which the skein is removed, washed with water and dried. There is obtained 62.17 parts of grafted threads, which when suspended and the ends ignited, are self-extinguishing when the source of flame is removed.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. The unsaturated halogenated ester having a formula selected from the class consisting of

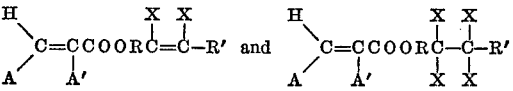

wherein

R is a divalent hydrocarbon radical having 1–10 carbon atoms therein;

R' is selected from the class consisting of H and monovalent hydrocarbon radicals of 1–20 carbon atoms;

X is bromine or chlorine;

A is selected from the class consisting of H, Cl, Br, and monovalent hydrocarbon radicals of 1–20 carbon atoms; and A' is selected from the class of Cl, Br and H, with the provision that A' is H only when A is Cl and Br.

2. The ester of claim 1 in which each A is hydrogen.
3. The ester of claim 2 in which R' is H.
4. The ester of claim 3 in which R is —$CH_2$—.
5. The ester of claim 4 in which A' is Cl.
6. The ester of claim 1 in which A' and A are both Cl.
7. The ester of claim 1 in which A' is Br.
8. The ester of claim 1 having the formula

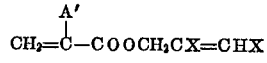

9. The ester of claim 1 having the formula

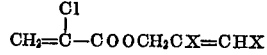

10. The ester of claim 1 having the formula

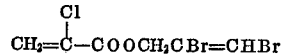

References Cited

UNITED STATES PATENTS

| 3,151,183 | 9/1964 | Bill et al. | 260—455 X |
| 3,316,329 | 4/1967 | Waples | 260—486 X |

LORRAINE A. WEINBERGER, Primary Examiner

P. J. KILLOS, Assistant Examiner